(12) United States Patent
Mankame et al.

(10) Patent No.: US 9,475,434 B2
(45) Date of Patent: Oct. 25, 2016

(54) DESIGNS AND PROCESSES FOR USING DISCRETE STIFFENERS TO CREATE LIGHT, STIFF AND STRONG AUTOMOTIVE STRUCTURES

(71) Applicant: GM GLOBAL TECHNOLOGY OPERATIONS LLC, Detroit, MI (US)

(72) Inventors: Nilesh D. Mankame, Ann Arbor, MI (US); Mark O. Vann, Riverview, MI (US); Julien P. Mourou, Bloomfield Hills, MI (US); Steven C. Lang, Columbus, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 29 days.

(21) Appl. No.: 14/454,611

(22) Filed: Aug. 7, 2014

(65) Prior Publication Data
US 2016/0039360 A1    Feb. 11, 2016

(51) Int. Cl.
*B60R 13/00* (2006.01)
*B60R 13/02* (2006.01)

(52) U.S. Cl.
CPC ..................... *B60R 13/02* (2013.01)

(58) Field of Classification Search
CPC ....................................................... B60R 13/02
USPC ..................... 296/191, 146.7, 1.08
See application file for complete search history.

(56) References Cited

U.S. PATENT DOCUMENTS

| | | | |
|---|---|---|---|
| 4,387,920 A | 6/1983 | Slaughter et al. | |
| 4,504,534 A | 3/1985 | Adachi et al. | |
| 4,978,562 A | 12/1990 | Wycech | |
| 5,145,285 A * | 9/1992 | Fox et al. | ............... 405/302.4 |
| 5,385,375 A | 1/1995 | Morgan et al. | |
| 5,804,511 A | 9/1998 | Kelman et al. | |
| 7,382,959 B1 | 6/2008 | Jacobsen | |
| 7,653,279 B1 | 1/2010 | Jacobsen | |
| 7,819,462 B1 | 10/2010 | Owens | |
| 8,182,025 B2 * | 5/2012 | Auchter-Bruening | ........ 296/191 |
| 8,485,588 B1 * | 7/2013 | Voss et al. | ............... 296/187.04 |
| 2008/0048462 A1 | 2/2008 | Zabik | |
| 2013/0038076 A1 | 2/2013 | Benvenuto et al. | |

FOREIGN PATENT DOCUMENTS

| | | | |
|---|---|---|---|
| EP | 1 300 293 A1 | 4/2003 | |
| WO | WO 88/03086 | * 5/1988 | |

OTHER PUBLICATIONS

Eldridge, David. "DuPont shows auto composite impact beam at K preview" Plastics News, European Plastics News, Jun. 14, 2013.

(Continued)

*Primary Examiner* — Joseph D Pape
(74) *Attorney, Agent, or Firm* — John A. Miller; Miller IP Group, PLC

(57) ABSTRACT

A technique for providing localized stiffening of a vehicle trim panel, especially for high curvature areas. The vehicle trim panel includes an outer panel having an outer show surface and an inner surface. A plurality of discrete reinforcement elements are bonded to the inner surface of the outer panel at locations where localized stiffening is desired. The discrete elements can come in a variety of different shapes and sizes, where the combination of elements and the number of elements is selected for a particular trim panel stiffness.

18 Claims, 4 Drawing Sheets

(56) References Cited

OTHER PUBLICATIONS

Strano, M. et al. "Non-Conventional Technologies for the Manufacturing of Anti-Intrusion Bars" 4 pgs.

* cited by examiner

DESIGNS AND PROCESSES FOR USING DISCRETE STIFFENERS TO CREATE LIGHT, STIFF AND STRONG AUTOMOTIVE STRUCTURES

BACKGROUND OF THE INVENTION

1. Field of the Invention

This invention relates generally to providing discrete stiffeners to reinforce a panel and, more particularly, to securing thermoplastic injection molded discrete stiffeners to a back surface of a show surface panel of an automotive trim panel.

2. Discussion of the Related Art

Trim panels on a vehicle, such as fascias, rockers, door moldings, etc., typically have an outward facing show surface, sometimes referred to as a class-A surface, that gives the panel an aesthetically pleasing appearance. Providing such show surfaces often requires relatively expensive materials and manufacturing processes. Thus, trim panels are typically made very thin to conserve cost. However, such trim panels often times have a two-dimensional or three-dimensional curvature and are required to be stiff enough to resist various loads without excessive deformation. In response to this, it is known in the art to make a trim panel as a two-piece structure including an outer show surface panel and an internal support structure often including a series of stiffening ribs forming a frame that provides structural integrity. The support structure may include a series of welding pads integrated into the support structure at locations where the ribs intersect. The welding pads have the general shape of the show surface panel and are used to ultrasonically weld the support structure to an inside surface of the show surface panel. The stiffness of the trim panel is set mainly by the height, thickness and spacing of the ribs.

In order to reduce cost and weight, it is desirable to limit the number of ribs in the support structure, which also reduces its stiffening capability. Thus, the ribs are generally selectively positioned and provided with different heights depending on where the structural integrity of the particular trim panel is desired. However, the height of the ribs is limited by the packaging volume of the trim panel. Further, although the show surface panel does possess some inherent stiffness, most of the stiffness is provided by the rib structure. Therefore, in order to further reduce the cost of the trim panel, it is desirable to make the show surface panel as thin as possible consistent with the ability of the support structure to provide the desired rigidity. However, because the support structure is welded to the show surface panel, there are limits as to how thin the show surface panel can be because the welding operation could cause imperfections on the show surface of the show surface panel if it is too thin. Further, for some types of trim panels, the panel is required to have a high degree of curvature to be formed at a desirable location. For these types of panels, traditional stiffeners, such as rib stiffeners, have not been adequate to provide local stiffening at high curvature areas.

SUMMARY OF THE INVENTION

The present disclosure describes a technique for providing localized stiffening of a vehicle trim panel, especially for high curvature areas. The vehicle trim panel includes an outer panel having an outer show surface and an inner surface. A plurality of discrete reinforcement elements are bonded to the inner surface of the outer panel at locations where localized stiffening is desired. The discrete elements can come in a variety of different shapes and sizes, where the combination of elements and the number of elements is selected for a particular trim panel stiffness.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a technique for providing discrete reinforcement of a structure is merely exemplary in nature, and is in no way intended to limit the invention or its applications or uses. For example, the discussion below describes reinforcing trim panels for a vehicle. However, as well be appreciated by those skilled in the art, the reinforcement technique of the invention may be applicable for other structures.

Figure 1:
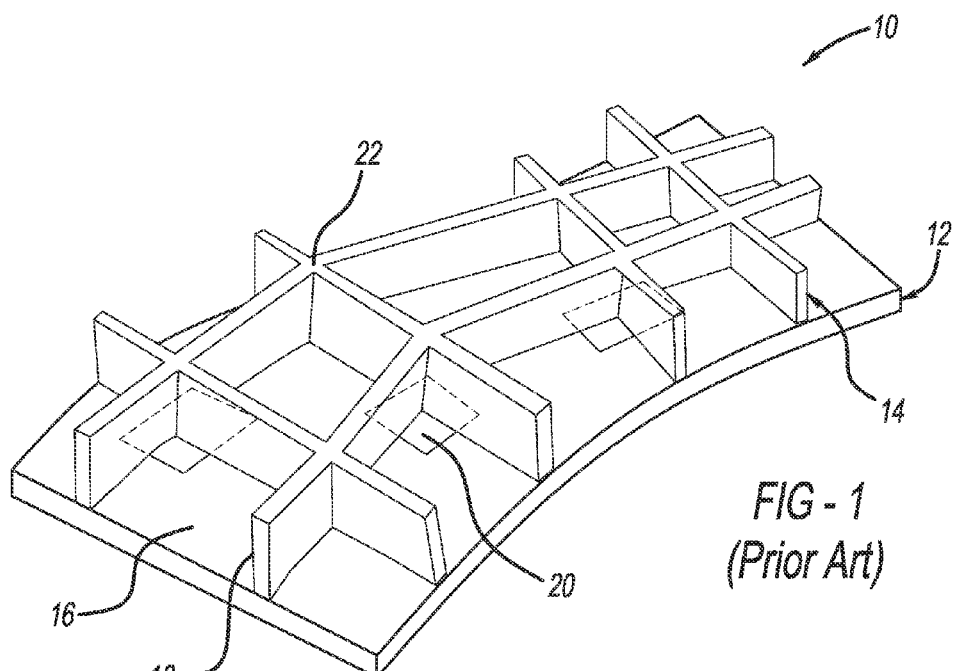
FIG. 1 is an isometric view of a known vehicle trim panel including a show surface panel and a support frame.

FIG. 1 is an isometric view of a known vehicle trim panel 10 including a show surface panel 12 and a rib support structure 14 of the type discussed above. The structure 14 is mounted to a backside surface 16 of the show surface panel 12 opposite to the show face of the panel 12. The structure 14 includes a series of crossing ribs 18 having a height, width and spacing determined by the desired structural integrity of the panel 10. A number of welding patches 20 are integrated into the structure 14 at intersection points 22 between the crossing ribs 18 to provide a surface to secure the structure 14 to the surface 16. The panel 10 has a number of drawbacks as discussed above, including limits to the height of the structure 14 by the packaging volume of the panel 10 and the thickness of the show face panel 12 to allow welding thereto.

As will be discussed in detail below, the present invention proposes employing discrete thermoplastic reinforcement elements that have been injection molded as stiffening elements adhered to a back surface of a vehicle trim panel to provide localized stiffening, especially at locations where the trim panel has a high degree of curvature. Different types and combinations of the discrete elements can be bonded to a particular trim panel, where the discrete elements have a desired shape, size, material, spacing, etc. Although the reinforcement elements discussed herein are described as thermoplastic reinforcement elements that allows them to be easily secured to thermoplastic trim panels by fusion bonding, the present invention contemplates any suitable material for the discrete reinforcement elements which may depend on the particular material of the trim panel.

Figure 2:
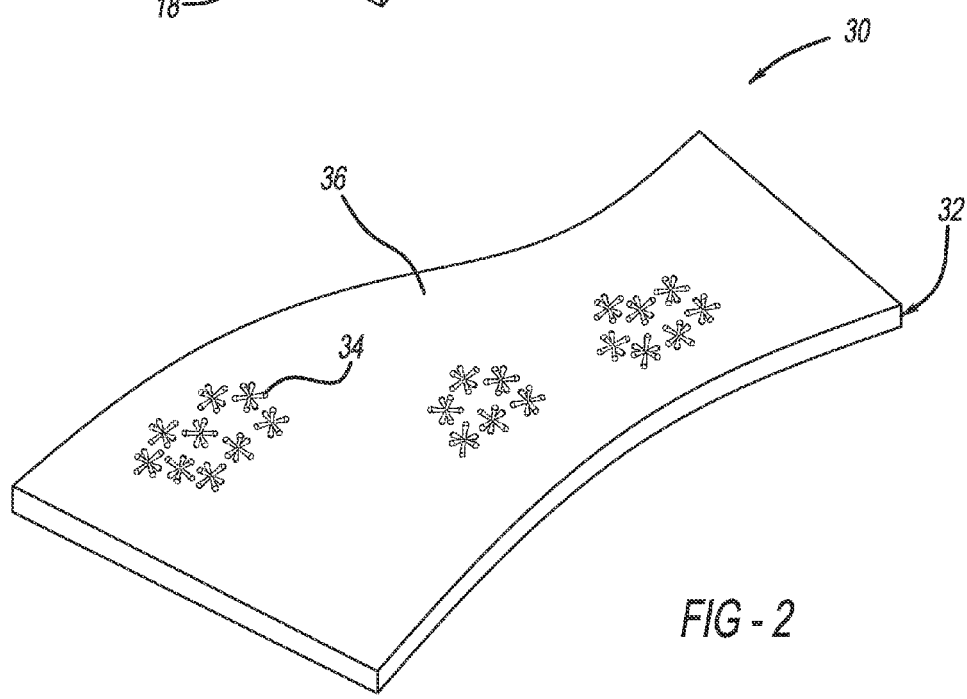
FIG. 2 is an isometric view of a trim panel for a vehicle including a show surface panel and a plurality of discrete reinforcement elements.

FIG. 2 is an isometric view of a vehicle trim panel 30 including a show surface panel 32 similar to the show surface panel 12 discussed above. Instead of using the rib support structure 14 to reinforce the show surface panel 32, the present invention employs a number of discrete reinforcement elements 34, here jack-type reinforcement elements, adhered to an inside surface 36 of the show surface panel 32 opposite to the show surface of the panel 32 to provide structural integrity for the panel 30. As mentioned above, the number, size, spacing, location, material, etc. of the reinforcement elements 34 would depend on a particular trim panel and desired level of rigidity. Further, the present invention proposes any suitable technique for securing the discrete elements to the show surface panel 32, where a couple of suitable techniques will be discussed in detail below.

Figure 3:
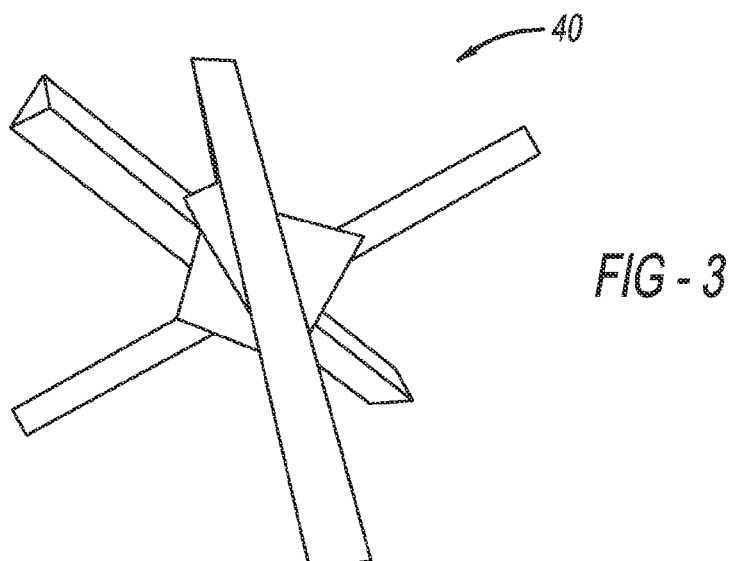
FIG. 3 is an isometric illustration of a hedgehog-type discrete reinforcement element.
Figure 4:
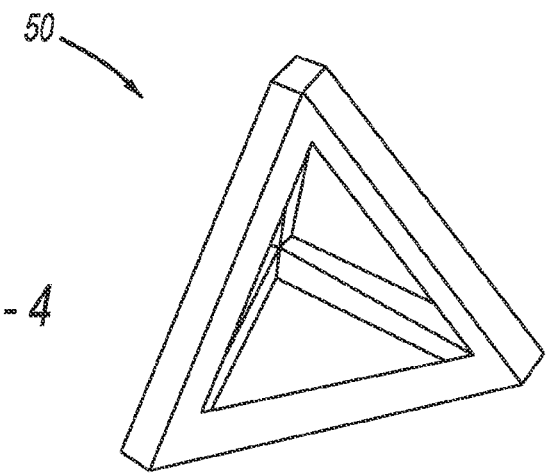
FIG. 4 is an isometric illustration of a tetrahedron-type discrete reinforcement element.

The present invention proposes any suitable shape for the discrete thermoplastic reinforcement elements that can be readily injection molded in mass quantities. Examples of other, non-limiting, discrete reinforcement elements are shown in FIGS. 3 and 4. Particularly, FIG. 3 shows a hedgehog-type reinforcement element 40 and FIG. 4 shows a tetrahedron dragon's tooth-type reinforcement element 50. The hedge-hog and tetrahedron-type reinforcement elements 40 and 50 may require a two-step injection molding process. The tetrahedron-type reinforcement elements 50 may require injection molding an open tetrahedron and then folding over molded arms of the tetrahedron to fusion bond or weld them together to form the final tetrahedron shape, where both steps can be accomplished in a single mold employing side-acting elements. The elements 34, 40 and 50 are symmetric elements and as such the orientation in which they are placed on the particular trim panel is not specific in that any orientation that they happen to be deposited on the trim panel will be just as effective as any other orientation. It is noted that a particular application for using the discrete reinforcement elements includes mixing and matching any suitable type of the elements for that application.

Figure 5:
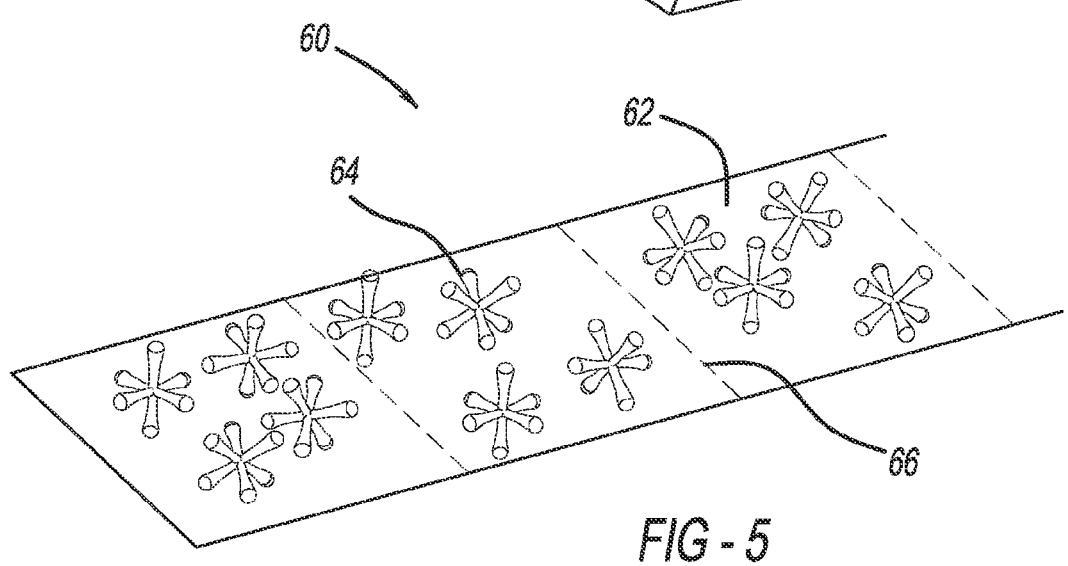
FIG. 5 is an isometric illustration of a reinforcement assembly including a number of jack-type discrete reinforcement elements bonded to a backing tape.

FIG. 5 is an isometric view of a reinforcement assembly 60 for a trim panel that includes a flexible support tape or skin 62 possibly provided in a roll. A number of discrete reinforcement elements 64 are adhered to a surface of the tape 62, where here the jack-type reinforcement elements are shown. The reinforcement elements 64 can be secured to the backing tape 62 by any suitable technique, such as gluing, adhesion, fusion welding, etc. The number, size, spacing, materials, etc., of the elements 64 is application specific for a particular trim panel to provide the desired flexibility and stiffness. Further, it is noted that although the jack-type reinforcement elements are shown in this embodiment, other reinforcement elements can also be employed and different types and sizes of reinforcement elements can be mixed and matched depending on the particular size. The pattern, number, orientation, etc. of the many discrete reinforcement elements 64 adhered to the tape 62 is designed to be sufficient to provide the flexibility and stiffness for a particular trim panel. The tape 62 includes perforations 66 that allow sections of the tape 62 to be removed to easily provide different lengths of tape sections for a particular application.

Figure 6:
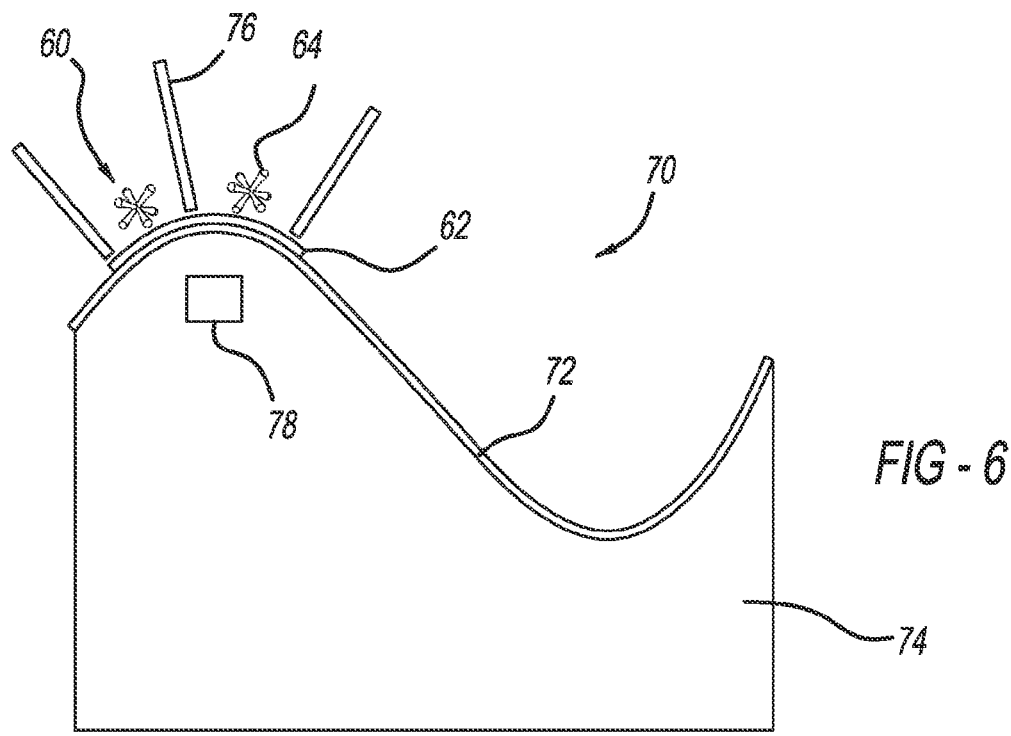
FIG. 6 is an illustration of the reinforcement assembly shown in FIG. 5 positioned on a vehicle trim panel.

The reinforcement assembly 60 can be secured to a trim panel in any desirable or effective manner. For example, FIG. 6 shows a processing assembly 70 including a highly curved vehicle trim panel 72 formed to a support or mold 74. The mold 74 can be an injection mold or otherwise that forms the trim panel 72, and may be a mold half of the entire mold. An articulating device including one or more articulating pins 76, such as a set of clamps, robotic end-effector, etc., picks up the assembly 60, positions it relative to the desired location on the trim panel 72 and bends the assembly 60 to conform it to the curvature of the trim panel 72, as shown. While in this position, the backing tape 62 is adhered to the trim panel 72, using, for example, fusion welding provided by a heat source 78. Alternatively, the backing tape 62 may have induction heatable particles embedded in or bonded to it, which can be heated by a remote RF source, such as the heat source 78, to enable fusion welding to the trim panel. Once the assembly 60 is secured to the trim panel 72, the articulating device releases the assembly 60 and may then place another reinforcement assembly.

Figure 7:
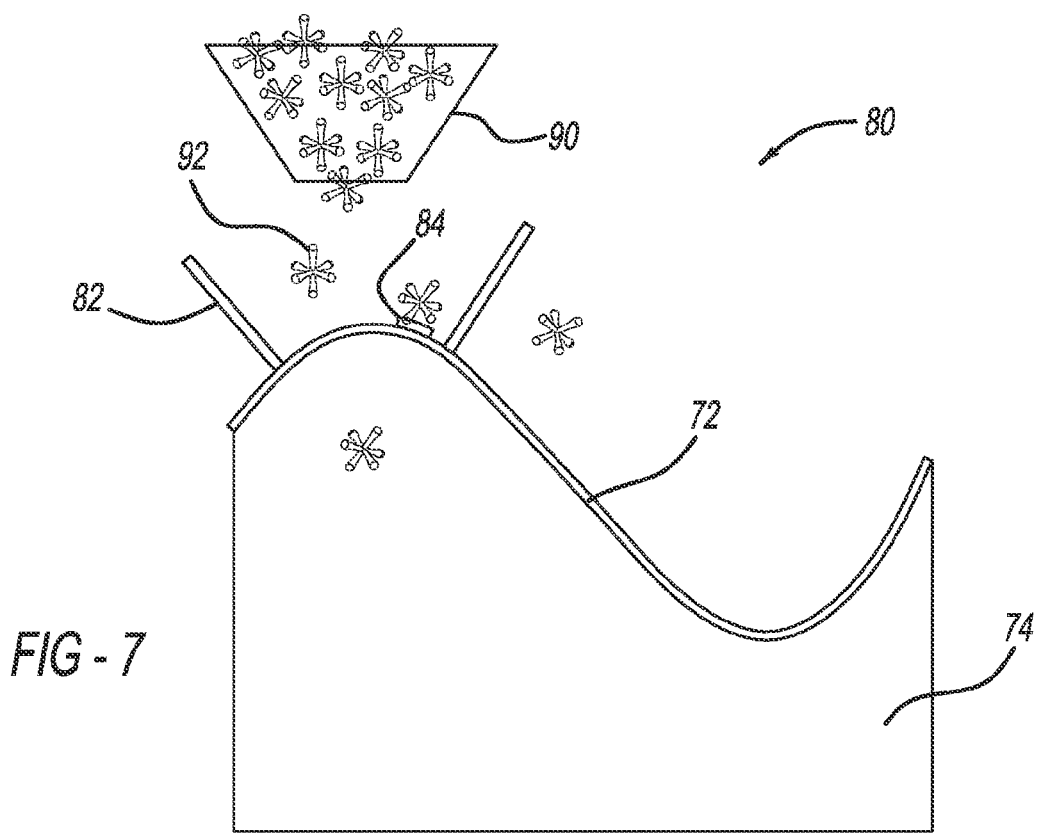
FIG. 7 is an illustration of a method for depositing discrete reinforcement elements on a vehicle trim panel.

Other techniques can also be employed to deposit the discrete reinforcement elements onto the trim panel. FIG. 7 shows another processing assembly 80 including the trim panel 72 and support mold 74 shown in FIG. 7. In this embodiment, the area of the trim panel 72 to be reinforced with the discrete elements is enclosed by a suitable enclosure 82 and desirable areas or locations within the blocked off area of the trim panel 72 are applied with patches 84 of glue provided by, for example, a glue applicator. Once the glue patches 84 are provided at the desirable location, a hopper 90 is positioned over the blocked off area and reinforcement elements 92, here non-limiting jack-type elements, are sprinkled into the enclosed area where those particular reinforcement elements 92 that land on the glue patches 84 are secured thereto and where the other reinforcement elements 92 fall away and are later collected. This process can be repeated where the glue patches 84 are applied at different times to adhere different types, sizes, etc. of the discrete elements 92 within the particular enclosed area.

Figure 8:
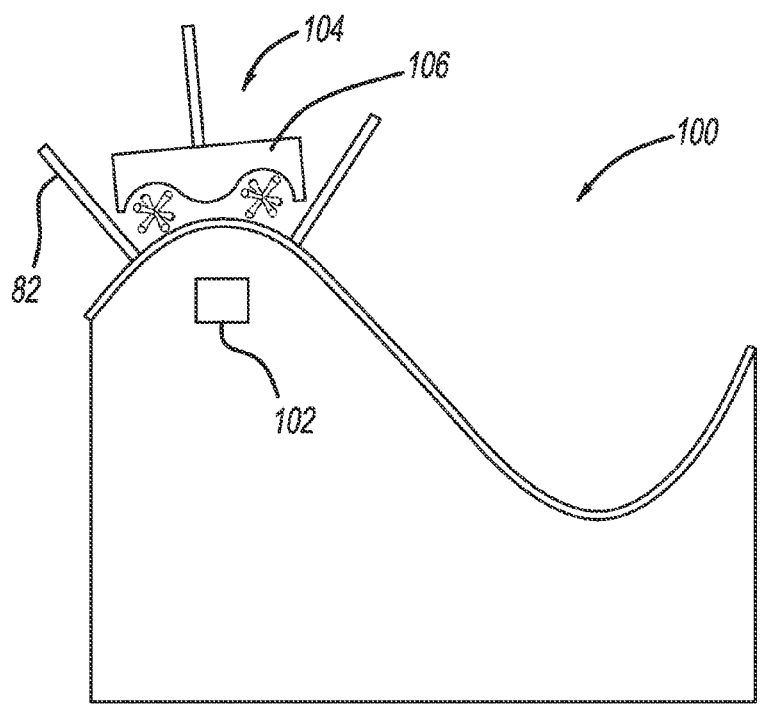
FIG. 8 is an illustration of a method for fusion welding discrete reinforcement elements to a vehicle trim panel using a pressure pad.

Once the desired number of the reinforcement elements 92 are attached to the reinforcement area by the glue, heat and pressure can be applied to the reinforcement elements 92 to further rigidly secure them to the trim panel 72. FIG. 8 shows a processing assembly 100 illustrating this. Particularly, the processing assembly 100 shows the discrete reinforcement elements 92 adhered to the trim panel 72 within the enclosure 82. A heat source 102 provides heat for fusion welding to weld the discrete elements 92 to the trim panel 72, where a pressure device 104 including a deformable portion 106 applies pressure to the discrete elements 92.

Once the discrete elements 92 are secured to the trim panel 72, it may be desirable to provide a thin thermoplastic skin (not shown) or other type of layer on an opposite side of the reinforcement elements 92 from the trim panel 72 to improve stiffness. This skin can be very flexible if the panel design is such that the skin is loaded in tension for at least most of the time. For regions of the trim panel 72 that can be reinforced using a small number of the discrete reinforcement elements 92, the particular reinforcement element 92 can be directly located at the desired position on the trim panel surface and pressed against the trim panel 72 and fusion welded in place.

Figure 9:
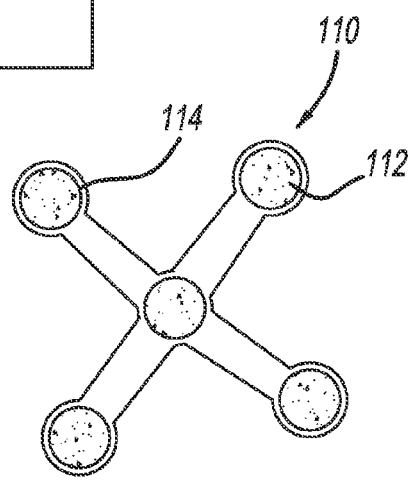
FIG. 9 is an illustration of a jack-type discrete reinforcement element including particles of a heatable material.

In an alternate embodiment, a number of the discrete reinforcement elements are first fused together to form a mass of several of the reinforcement elements prior to the reinforcement elements being secured to the trim panel to provide the stiffening. This embodiment is partially illustrated in FIG. 9 showing a jack-type discrete reinforcement element 110 formed with particles 112 of a heatable material. In one particular embodiment, the particles 112 of the heatable material are formed at termination ends 114 of the arm of the jack-type reinforcement elements 110. To form such a discrete element, the injection process can employ two different types of pellets including one type of pellet having the heatable material particles dispersed 112 therein, which is injection molded first, and a second type of pellet having the plastic material without the particles 112 that is injection molded second. Alternately, only the pellets with the heatable material particles 112 can be employed. The particles 112 can be any suitable particle for the purposes described herein, such as induction current heating particles, eddy current heating particles and RF heatable particles.

Figure 10:
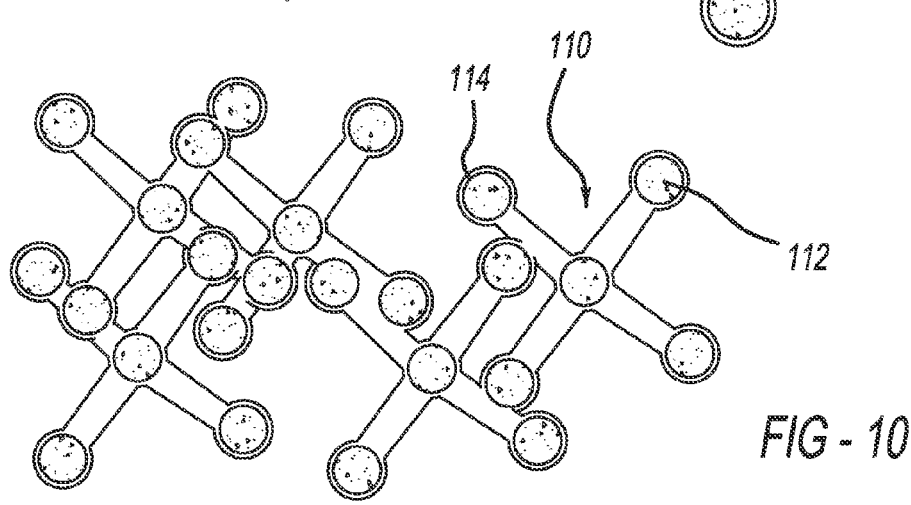
FIG. 10 is an illustration of a fused mass of the discrete reinforcement elements shown in FIG. 9.

Several of the discrete elements 110 can be nested together using a suitable enclosure device (not shown) so that they are in contact with each other. Slight pressure is applied to push the reinforcement elements 110 together and then fusion welding is employed to heat the heatable particles 112 and fuse the elements 110 together. FIG. 10 is an illustration of a nested mass 120 of the reinforcement elements 110 after they have been fused together, but before the mass 120 is adhered to the trim panel. Once the mass 120 of the discrete elements 110 is formed, it is then placed on the trim panel at the desired location and fusion welding is again used to secure the mass 120 to the trim panel. Pressure can be applied to the nested reinforcement elements 110 to further enhance the fusion welding process. The reinforcement elements 110 provided in the mass 120 can be of different materials, different dimensions, different flake loadings, etc. Additionally, all of the termination ends 114 can be loaded with the heatable particles 112 or only some of the termination ends can be loaded with the heatable particles 112 where the non-loaded termination ends 114 may create fold lines in the nested mass 120 to allow it to be better formed to the trim panel.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A panel assembly comprising:
    a panel including an outer surface and an inner surface; and
    a plurality of discrete reinforcement elements bonded to the inner surface of the panel, wherein the plurality of discrete elements include interdispersed heatable particles that are fusion bonded to provide a nested mass of the discrete elements.

2. The assembly according to claim 1 wherein the plurality of discrete elements are fusion bonded to the inner surface of the panel.

3. The assembly according to claim 1 wherein the plurality of discrete elements are adhesively bonded to the inner surface of the panel.

4. The assembly according to claim 1 wherein the plurality of discrete elements are jack-type discrete elements.

5. The assembly according to claim 1 wherein the plurality of discrete elements are hedgehog-type discrete elements.

6. The assembly according to claim 1 wherein the plurality of discrete elements are tetrahedron-type discrete elements.

7. The assembly according to claim 1 wherein the plurality of discrete elements are the same type of discrete elements.

8. The assembly according to claim 1 wherein the plurality of discrete elements are combinations of different types of discrete elements.

9. The assembly according to claim 1 wherein the plurality of discrete elements are fusion bonded together prior to being bonded to the inner surface of the panel.

10. The assembly according to claim 1 wherein the plurality of discrete elements are bonded to a backing tape and the backing tape is bonded to the panel.

11. The assembly according to claim 1 wherein the plurality of discrete elements are thermoplastic discrete elements.

12. The assembly according to claim 1 wherein the panel is a vehicle trim panel.

13. The assembly according to claim 12 wherein the outer surface is a show surface of the panel.

14. A trim panel for a vehicle, said trim panel comprising:
    an outer panel including an outer show surface and an inner surface;
    a plurality of discrete jack-type reinforcement elements bonded to the inner surface of the outer panel; and
    a thin thermoplastic skin layer on a side of the plurality of discrete jack-type reinforcement elements that is opposite to the inner surface of the outer panel.

15. The trim panel according to claim 14 wherein the plurality of discrete reinforcement elements are bonded to a location of the panel requiring localized stiffness enhancement due to panel curvature.

16. The trim panel according to claim 14 wherein the plurality of discrete elements includes discrete elements having different stiffness characteristics.

17. The trim panel according to claim 14 wherein the plurality of discrete elements are adhesively bonded to the inner surface of the panel.

18. The trim panel according to claim 14 wherein the plurality of discrete elements are bonded to a backing tape and the backing tape is bonded to the inner surface of the panel.

* * * * *